(12) United States Patent
Mayerle

(10) Patent No.: US 12,457,940 B2
(45) Date of Patent: Nov. 4, 2025

(54) WEED SEED DESTRUCTION

(71) Applicant: Tritana Intellectual Property Ltd., Saskatoon (CA)

(72) Inventor: Dean Mayerle, Saskatoon (CA)

(73) Assignee: Tritana Intellectual Property Ltd., Saskatoon (CA)

( * ) Notice: Subject to any disclaimer, the term of this patent is extended or adjusted under 35 U.S.C. 154(b) by 726 days.

(21) Appl. No.: 17/738,132

(22) Filed: May 6, 2022

(65) Prior Publication Data

US 2023/0037095 A1    Feb. 2, 2023

Related U.S. Application Data

(60) Provisional application No. 63/227,575, filed on Jul. 30, 2021.

(51) Int. Cl.
*A01F 12/40* (2006.01)
*A01F 12/48* (2006.01)

(52) U.S. Cl.
CPC .............. *A01F 12/40* (2013.01); *A01F 12/48* (2013.01)

(58) Field of Classification Search
CPC ...... A01F 12/40; A01F 12/48; A01D 41/1243
See application file for complete search history.

(56) References Cited

U.S. PATENT DOCUMENTS

| | | |
|---|---|---|
| 2,064,689 A | 12/1936 | Russwurm |
| 2,557,865 A | 6/1951 | Emmanouilidis |
| 2,775,174 A | 12/1956 | Everett |
| 3,071,246 A | 1/1963 | Schimke |
| 3,448,933 A | 6/1969 | Roy |
| 3,894,695 A | 7/1975 | Benedikter |
| 4,591,102 A | 5/1986 | Clarke |
| 4,637,406 A | 1/1987 | Guinn |

(Continued)

FOREIGN PATENT DOCUMENTS

| | | |
|---|---|---|
| AU | A-37966/95 | 5/1996 |
| AU | 200138781 | 10/2001 |

(Continued)

OTHER PUBLICATIONS

Melba Philips and Hellmut Fritzsche, electromagnetic radiation, Dec. 24, 2024, Britannica (Year: 2024) https://www.britannica.com/science/electromagnetic-radiation.*

(Continued)

*Primary Examiner* — Joseph M Rocca
*Assistant Examiner* — Sunny D Webb
(74) *Attorney, Agent, or Firm* — Adrian D. Battison; Ade & Company Inc.; Ryan W. Dupuis

(57) ABSTRACT

Weed seeds are destroyed in the chaff from a combine harvester by primary and secondary destructors where the primary feeds to the secondary. The secondary can use repeated high speed impacts caused by a rotor mounted in one of a pair of side by side housings which accelerate the discarded seeds in a direction centrifugally away from the rotor onto a stator including angularly adjustable stator surfaces around the axis. The primary can also use an impact arrangement of a different and simplified structure or can use another destruction modality such as radiation. The primary is mounted at a transfer device including a transverse auger which carries the chaff and weed seeds from the rear of the sieve to the secondary.

18 Claims, 8 Drawing Sheets

(56) References Cited

U.S. PATENT DOCUMENTS

| | | | |
|---|---|---|---|
| 4,711,253 | A | 12/1987 | Anderson |
| 4,917,652 | A | 4/1990 | Glaubitz |
| 4,923,431 | A | 5/1990 | Miller |
| 5,425,507 | A | 6/1995 | Stumpff |
| 5,556,042 | A | 9/1996 | Roberg |
| 5,944,604 | A | 8/1999 | Niermann |
| 6,500,064 | B1 | 12/2002 | Schrattenecker |
| 6,547,169 | B1 | 4/2003 | Matousek |
| 6,656,038 | B1 | 12/2003 | Persson |
| 6,685,558 | B2 | 2/2004 | Niermann |
| 6,688,971 | B2 * | 2/2004 | Buermann .............. A01F 12/40 460/112 |
| 6,840,854 | B2 | 1/2005 | Redekop |
| 6,908,379 | B2 | 6/2005 | Gryspeerdt |
| 8,152,610 | B2 | 4/2012 | Harrington |
| 8,167,691 | B2 | 5/2012 | Pohlmann |
| 8,210,915 | B2 | 7/2012 | Holmen |
| 8,789,785 | B2 | 7/2014 | Lelas |
| 9,497,903 | B2 | 11/2016 | Biggerstaff |
| 9,635,813 | B2 | 5/2017 | Dilts |
| 9,686,916 | B2 | 6/2017 | Biggerstaff |
| 9,723,790 | B2 | 8/2017 | Berry |
| 9,730,390 | B2 | 8/2017 | Maes |
| 9,949,434 | B2 | 4/2018 | Baes |
| 10,004,176 | B2 | 6/2018 | Mayerle |
| 10,390,491 | B2 * | 8/2019 | Rittershofer ....... A01D 41/1276 |
| 10,653,069 | B2 | 5/2020 | Farley |
| 10,986,778 | B2 * | 4/2021 | Chaney ................. A01M 21/02 |
| 2003/0003974 | A1 | 1/2003 | Niermann |
| 2003/0114207 | A1 | 6/2003 | Wolters |
| 2004/0132517 | A1 | 7/2004 | Weihholdt |
| 2005/0277454 | A1 | 12/2005 | Couture |
| 2010/0291985 | A1 | 11/2010 | Pohimann |
| 2011/0059782 | A1 | 3/2011 | Harrington |
| 2014/0364179 | A1 | 12/2014 | Brinkmann |
| 2015/0373913 | A1 | 12/2015 | Berry |
| 2016/0044869 | A1 | 2/2016 | Mayerle |
| 2016/0044870 | A1 | 2/2016 | Mayerle |
| 2016/0113202 | A1 | 4/2016 | Mayerle |
| 2016/0150727 | A1 | 6/2016 | Mayerle |
| 2016/0150728 | A1 | 6/2016 | Duquesne |
| 2017/0079207 | A1 * | 3/2017 | Puryk ..................... A01F 12/40 |
| 2017/0238463 | A1 | 8/2017 | Van de Wege |
| 2018/0070534 | A1 | 3/2018 | Mayerle |
| 2018/0249641 | A1 | 9/2018 | Lewis |
| 2018/0317392 | A1 | 11/2018 | Mayerle |
| 2018/0368319 | A1 | 12/2018 | Desmet |
| 2020/0296896 | A1 | 9/2020 | Mayerle |
| 2021/0022289 | A1 | 1/2021 | Berry |
| 2021/0282329 | A1 | 9/2021 | Hall |
| 2022/0008889 | A1 | 1/2022 | Jackson |

FOREIGN PATENT DOCUMENTS

| | | | | |
|---|---|---|---|---|
| AU | 2019202177 | | 10/2019 | |
| AU | 2014218502 | | 8/2023 | |
| AU | 2017228663 | | 12/2024 | |
| AU | 2018100350 | | 1/2025 | |
| CN | 20244482 | | 9/2012 | |
| DE | 382632 | | 10/1923 | |
| DE | 19906524 | | 8/2000 | |
| DE | 102006040255 | | 4/2007 | |
| DE | 102009042002 | | 3/2011 | |
| DE | 102011088512 | | 1/2013 | |
| DE | 102018131432 | | 6/2020 | |
| EP | 312727 | A * | 4/1989 | ............ A01D 41/12 |
| EP | 1027820 | | 8/2000 | |
| EP | 1191835 | | 4/2002 | |
| EP | 1219163 | A1 * | 7/2002 | ........... A01F 29/025 |
| EP | 1442649 | | 8/2004 | |
| EP | 1905291 | | 4/2008 | |
| EP | 2976937 | | 1/2016 | |
| EP | 3520596 | | 8/2019 | |
| GB | 1062209 | | 3/1967 | |
| WO | WO 01/01754 | | 1/2001 | |
| WO | WO-2008156419 | | 12/2008 | |
| WO | WO-2009100500 | | 8/2009 | |
| WO | WO-2014127408 | | 8/2014 | |
| WO | WO-2014127408 | A1 * | 8/2014 | ............ A01F 12/40 |
| WO | WO2017/008161 | | 1/2017 | |
| WO | WO2018/053600 | | 3/2018 | |
| WO | WO2019178651 | | 9/2019 | |
| WO | WO-2020160622 | | 8/2020 | |
| WO | WO2020/181385 | | 9/2020 | |

OTHER PUBLICATIONS

Melba Philips and Hellmut Fritzsche, electromagnetic radiation, Dec. 24, 2024, Britannica https://www.britannica.com/science/electromagnetic-radiation (Year: 2024).*

* cited by examiner

WEED SEED DESTRUCTION

This application claims the benefit under 35 USC 119 (e) of provisional application 63/227,575 filed Jul. 30 2021, the disclosure of which is incorporated herein by reference.

This invention relates to a weed seed destructor which can be attached to a combine harvester so that weed seeds in the discharged chaff can be devitalized before being spread onto the ground.

BACKGROUND OF THE INVENTION

In U.S. Pat. No. 10,004,176 published Jun. 26, 2018 and US Publication US2018/0070534 published Mar. 15 2018 there is disclosed an arrangement in which weed seeds are destroyed in the chaff from a combine harvester by a rotary mill causing repeated high speed impacts by a rotor mounted in one of a pair of side by side housings which accelerate the discarded seeds in a direction centrifugally away from the rotor onto a stator including angularly adjustable stator surfaces around the axis. Thus the discarded seeds rebound back and forth between the rotor and the stator to provide a plurality of impacts. The angle of the discharge around the rotor axis can be changed to direct the seeds to the side of the combine away from a straw chopper, towards the guide fins of the tailboard of the chopper, or into the housing of the straw chopper.

A further improvement is shown in US published application US2020/0107502 published Apr. 9, 2020 by the present applicant which shows an arrangement of stator bars which are shaped to provide an improved impact action on the seeds.

Recent developments in combine harvesters have been directed to provide a residue management system designed both to kill weed seeds and to distribute the harvest residue (MOG—Material Other than Grain) back over a combine's entire cutting width in an even and consistent manner. One system, described in application US 2020/0296896 published Sep. 24 2020 by the present applicant, provides an improved weed seed destructor (WSD) that comprises two rotor/stator arrangements each of which is mounted co-axially at respective ends on a transverse shaft of the straw management system, typically the straw chopper, and works well with a traditional straw chopping system. The two destructor arrangements are fed by a transfer arrangement collecting the chaff and weed seeds from the rear edge of the sieve which includes a transverse auger carrying the material to the sides where respective fans drive the material rearwardly through respective ducts to inlets of the two destructor arrangements. This system relies on the destruction carried out by the impacts in the two destructors so that they must individually provide enough impacts to carry out the necessary destruction.

It is known also from published US applications 2020/0120917 published Apr. 23 2020 and 2022/0008889 published Jan. 13, 2022 of Jackson that weed seeds can be devitalized by application of light. In these arrangements the chaff and seeds can be carried by a conveyor through an area of illumination to cause the required devitalization.

The disclosures of each of the above cited documents are incorporated herein by reference.

The term weed seed destruction used herein is used somewhat colloquially in that the seeds are not annihilated but are devitalized or rendered so that they cannot germinate. It will of course also be appreciated that not necessarily each and every seed is destroyed but that the intention is that a significant number will be incapable of germination so as to reduce the number of emerging seeds in the next growing season. Many different modalities for causing this devitalization are possible including grinding, impacts, radiation and chemical systems.

SUMMARY OF THE INVENTION

It is one object of the present invention to provide a weed seed destruction arrangement which provides an effective or required level of devitalization while using an arrangement which can be simplified in structure allowing better flow of material and less wear on the parts through which the material passes.

According to one aspect of the invention there is provided a combine harvester comprising:

a separation system for separating from harvested crop a first material including straw and a second material including chaff and weed seeds;

the separation system including at least one sieve at a rear end of which the second material is discharged;

and a weed seed destructor apparatus comprising:

a primary destructor arranged to receive the second material, the primary destructor having one or more components acting on the weed seeds so as to cause devitalization of at least some of the weed seeds so that they cannot germinate and discharge outlet for discharge of the second material after devitalization;

a secondary destructor having a feed inlet arranged to receive the second material from the discharge outlet of the primary destructor, the secondary destructor having one or more components acting on the weed seeds so as to cause devitalization of at least some of the weed seeds so that they cannot germinate;

In one optional arrangement which can be used herein, the components of the primary destructor can be different from the components of the secondary destructor.

In one optional arrangement which can be used herein, the components of the primary destructor can function differently from the components of the secondary destructor.

In one optional arrangement which can be used herein, the components of the primary destructor can be different from the components of the second destructor so that a number of seeds devitalized in the primary is different from that in the secondary.

In one optional arrangement which can be used herein, the primary and secondary destructors can use different devitalization modalities.

Preferably one of the primary and secondary destructors uses a rotor and stator arrangement for generating multiple impacts on the weed seeds.

In one optional arrangement which can be used herein, one of the primary and secondary destructors can use radiation applied to the seeds where the radiation comprises electromagnetic radiation which can include heat and/or light.

The combination of impact devitalization and radiation devitalization can thus be used in the present arrangement to obtain the best advantages of both systems. This can be used to devitalize the maximum number of seeds while each system works to its best effect to cause devitalization of different types of seed so as to reduce the power and complexity applied to both systems.

In one optional arrangement which can be used herein, there is provided a transfer arrangement at the rear edge of the sieve arranged to transfer the second material to the secondary destructor where the primary destructor is arranged in the transfer arrangement.

Preferably there is provided a rotary transfer member arranged to carry the second material and the primary destructor is arranged at the rotary transfer member. In this arrangement, the radiation can be applied to the second material in the rotary transfer member.

The application of the radiation to the material while in the rotary transfer member which is typically an auger flight ensures that the material is open and separated to allow the radiation to better penetrate to the weed seeds. This is in contrast to an arrangement where the radiation is applied to the material while it is within an impact type mill or in the entrance to or exit from mill where the material is concentrated and compressed thus reducing the ability of the radiation to penetrate.

Preferably the transfer arrangement includes fan blade members at respective ends of the rotary transfer member directing the second material into respective first and second destructor elements of the secondary destructor.

In another arrangement, the secondary destructor includes a rotor having an inner set of rotor elements and an outer ring of rotor elements and the primary destructors also use the impact system and include a rotor having an only inner set of rotor elements so that the primary provides fewer impacts on the weed seeds than the secondary. This provides two impact systems each of which can therefore be much simplified creating a total system which allows better flow rates, lower power requirements and reduces wear to the individual parts.

According to a second aspect of the invention there is provided a combine harvester comprising:
  a separation system for separating from harvested crop a first material including straw and a second material including chaff and weed seeds;
  the separation system including at least one sieve at a rear end of which the second material is discharged;
  a transfer arrangement at the rear edge of the sieve arranged to transfer the second material comprising:
    a rotary transfer member at the rear edge arranged to carry the second material to respective ends of the rotary transfer member
    fan blade members at said respective ends of the rotary transfer member;
  and a weed seed destructor comprising:
    a primary destructor having one or more components acting on the weed seeds so as to cause devitalization of at least some of the weed seeds;
    a secondary destructor arranged to receive the second material from the primary destructor, the secondary destructor having one or more components acting on the weed seeds so as to cause devitalization;
  wherein the primary destructor is mounted on the transfer arrangement.

Again as set forth above, the components of the primary destructor can be different from the components of the secondary destructor so that a number of seeds devitalized in the primary is different from that in the secondary.

Again as set forth above, the primary and secondary destructors can use different devitalization modalities where one or both of the destructors uses a rotor and stator arrangement for generating multiple impacts on the weed seeds or where at least one of the destructors uses radiation, such as heat and/or light applied to the seeds.

That is, according to an alternative definition of the invention, the weed seed destructor apparatus is divided into a primary destructor section and a secondary destructor section where the second material is processed in the primary destructor section in a first operation and is then is removed from the primary destructor section and at least a part is transferred to the secondary to be processed in a second operation.

The transfer from the discharge of the primary to the feed inlet of the secondary can include a specific transfer duct which at least partly contains and directs the material during its transfer. The duct may be formed by containing walls surrounding the material. However at least part and optionally all of the transfer can be carried out in free space with no containing walls by the momentum in the material as it exits the discharge from the primary. The stream may also be partially confined on one or more sides. The inlet of the secondary can be formed into a larger target by providing some shape of funnel arrangement which catches the material in transfer and directs it into the relatively small inlet. The key point is that the material discharges from the primary and is transferred to the secondary where it is processed separately in the second step. Where the material is directed in an air stream, the primary and secondary destructors may be arranged at an angle relative to one another that the discharge and inlet lie on a straight line. This the axes of rotation may therefore be at an angle to one another rather than parallel or at right angles.

That is, according to an alternative definition of the invention, the primary destructor includes an outer housing wall at least partly surrounding an axis of the primary rotor which contains the second material against radially outward movement and directs the second material to a discharge outlet of said primary destructor for communication to the secondary destructor.

In one preferred arrangement, the primary rotor and secondary rotor are driven by separate shafts. However, this is not essential and by selection of suitable geometry, the concept defined above can be used where the primary and secondary rotors are both in the same shaft with one feeding partially processed material to the other.

In one preferred arrangement, the primary rotor and secondary rotor rotate about different axes. However, again this is not essential and by selection of suitable geometry, the concept defined above can be used where the primary and secondary rotors are both rotatable about the same axis.

In order that the discharge from the primary destructor can be collected and transferred to the secondary, preferably the primary destructor includes an outer housing wall at least partly surrounding an axis of the primary rotor which contains the second material against radially outward movement and directs the second material to the discharge outlet for communication to the secondary destructor.

In one preferred arrangement, the primary stator is of a simplified construction relative to prior art devices and comprises a plurality of impact surfaces at or adjacent the outer housing wall. This can provide a primary impact arrangement for an initial process step without complex annular rings of impact bars of the type used in the prior art. In this arrangement preferably the impact surfaces of the primary stator are arranged at angularly spaced positions around the axis and at an angle to a tangent to the outer housing wall. That is preferably the impact surfaces each comprise two simple flat surfaces arranged in a V-shape converging to an apex parallel to the axis. This arrangement has been found to generate back and forth impacts on the seeds between the inclined stator surfaces and the surfaces of the rotor blades.

Thus the impact surfaces can be of the type shown in FIGS. 3, 4 and 5 of U.S. Pat. No. 10,004,176 issued Jun. 26 2018, where the apex between the two flat surfaces is parallel to the axis and is radially outward of the surfaces.

In one preferred arrangement, the discharge outlet defined by the housing wall extends outwardly from an opening at an angularly confined portion of the outer housing wall. In this way the material rotates typically only around the axis with the rotor over an angle less than 360 degrees to move to the outlet which is coplanar with the rotor.

However alternative arrangements using different geometry can be used for example as shown in the above patent where the material after processing moves axially for collection and transfer to the secondary destructor.

In one preferred arrangement, the primary rotor and secondary rotor have axes parallel and offset and the transfer duct carries the discharge from the primary destructor in a direction transverse to the axes.

In one preferred arrangement, the feed inlet of the secondary destructor feeds the discharge in a direction transverse to a radial plane of the axis of the secondary rotor so as to enter the secondary destructor into its housing from one end of the secondary rotor. In this arrangement preferably the transfer duct carries the material radially along an outside of a housing of the primary destructor and then axially into a housing of the secondary destructor.

In one preferred arrangement, where the primary rotor and secondary rotor are driven by separate shafts, preferably one shaft drives one component of the combine harvester and the other shaft drives another component of the combine harvester.

For example, the shaft of the primary rotor can drive a rotary transfer member, typically an auger, arranged to collect the second material and carry the collected material to at least one primary rotor on the shaft. Preferably there are two primary destructors one on each end of the auger flight. An arrangement of this type is shown in the above U.S. patent and is incorporated herein by reference.

For example, the shaft of the secondary rotor can drive a component of a straw management system of the combine harvester. This component can be a straw chopper of the type located at the rear of the combine harvester, or it may be an internal chopper or beater acting on the straw within the body of the combine, or it may be the shaft of a powered spreader.

In one preferred arrangement, the primary destructor includes two primary destructor components with one on each side of the combine harvester and the secondary destructor includes two secondary destructor components with one on each side of the combine harvester and each primary component feeds discharge to each respective secondary component. However other arrangements are possible. There may be different numbers of primary and secondary destructors. In this way two or more primary destructors may feed a single secondary. In this way, a single primary may feed two or more secondary destructors. While the location of these components on respective sides of the combine and thus at respective ends of drive shafts is advantageous, other arrangements can be provided. For example, either the primary or the secondary or both can be arranged so that the rotors rotate about upright axes and be located behind the sieve at a position independent of the straw management system. In this way the destructors can be driven independently of the straw management system. One important advantage herein is that the separation of the destructor mill into primary and secondary components allows the construction of each to be simplified while reducing the need for fine tolerances. This advantage can be used in many different geometries, drive arrangements and locations of the mills In one preferred arrangement, the secondary stator of said secondary destructor includes only two stator rings where an inner ring includes stator bars with spaces therebetween for passage of the material and an outer ring is defined by an outer secondary housing wall at least partly surrounding an axis of the secondary rotor which contains the material against radially outward movement and directs the material to a secondary discharge outlet of the secondary destructor. That is the above concept allows not only the construction of the primary destructor to be simplified but also the secondary can also be a simple two ring construction.

In this arrangement, preferably the secondary stator comprises a plurality of impact surfaces at or adjacent the outer housing wall. Preferably the impact surfaces of the secondary stator are arranged at angularly spaced positions around the axis and at an angle to a tangent to the outer housing wall. These impact surfaces can be similar to those of the primary as set out above where the impact surfaces of the secondary stator comprise two surfaces arranged in a V-shape converging to an apex parallel to the axis.

In an alternate arrangement, the secondary weed seed destructor can be made with a rotor with two upstanding rings of posts and two circular arrays of stationary U bars and a reflecting outer surface to maximize devitalization rates in small or difficult to kill weed seeds.

The arrangement herein may provide one or more of the following features:

To increase the life of the WSD and reduce its complexity and thus service times.

A simplification of the WSD mill on the chopping rotor shaft and design of the chopper housing is necessary to allow quick and easy servicing.

To provide a longer life between servicing of the rotor mounted mill which is typically more difficult to service.

To use two mills in series to destroy weed seeds discharged by a harvester.

To increase the devitalization rate of a WSD system while reducing overall power requirements and increasing throughput capabilities.

To utilize simplified and cost reduced methods to increase mill life while creating reduced post-harvest service times.

To spread mill wear over more surface area to reduce component change intervals.

To streamline weed seed flow to reduce abrasive wear and turbulent air movement while maintaining devitalization rates.

Reduction of operating power.

Increase in spreading efficiency.

Reduced spatial requirement on the combine harvester,

Additional foreign object protection for the weed seed destructor. The housing for the auger flighting can be designed so that the bottom of the housing is not tight to the auger flighting. The high speed of the auger flighting will drive any heavy objects—rocks or metal—into the void (or rock trap) allowing the auger to only move the lighter chaff.

The arrangement herein thus provides a weed seed destructor on a combine harvester with the objective of providing a means of damaging the weed seeds in the chaff so that they are unviable and do not germinate after the chaff is spread evenly out on the field during harvesting. When a combine is fitted with a WSD, it is very important that the original functionality of the combine is not compromised.

In this invention, simplified three or more destruction devices work in tandem to increase the overall weed seed devitalization rates as compared to a traditional two mill system. In the disclosed system of two pairs of two series mills on each side of the residue system, each of the mills does less work to the chaff while increase the total devitalization rate. This increases the through put capability of the mills as seeds are bruised while less processing is done to the chaff. Chaff and weeds seeds are given a chance to re-mix between mills and are then processed a second time resulting in new surfaces bruised and increased randomization. The surface area in the two mills in series is greatly enhanced such that with the reduced processing in each mill there is a significant increase in wear life of the components.

Because the combination of the mills in a series configuration can achieve required kill rates >95%, much less power is required, while the flow rate capabilities are increased. Residue is more easily able to flow through the system resulting in lower power requirements.

Although more mills are utilized in the system, each mill is much less complex and much easier to manufacture, not requiring the fine tolerances of previous multistage systems. This allows for the throughput of foreign objects should they get through the natural trap design with the auger collection system. The disclosed lower complexity mills are much easier to replace internal components and last longer due to the greater surface area of the combined mill system.

The weed seed destructor section can be of many different types. Examples can include:

the arrangements shown and described herein;

U.S. Pat. No. 8,152,610 (Assignee: GRDC|Inventor: Harrington|2008) details a large and heavy weed seed destructor mill which is mounted on a mobile frame, powered by a separate engine and is pulled behind a combine harvester. The mill is made with two counter rotating rotors. Chaff and weed seeds are collected from the combines sieves and blown from the harvester to trailing unit. The chaff and weed seeds enter the center of the rotating rotors and pass through the multiple counter rotating rings causing damage and devitalization to any seeds in the chaff. The residue is then spread out behind the trailed unit.

WO 2014/127408 (Applicant: GRDC Inventors: Berry/Saunders 2014) disclosures a further development that was made following the GRDC machine discussed above. However, unlike the machine discussed above, it discloses a weed seed destructor unit which is mounted on the combine harvester behind the sieves. The weed seed destructor mill has a circular array of stationary bars positioned at an angle to the rotation of a rotor, such that there are blunt hits (i.e. impacts) to deflect seeds back into the rotation of the rotor while the seeds and the chaff pass through the destructor. The residue passes through multiple rings of stationary and rotating bars which inflict damage on any seeds in the chaff. The residue is then spread out to the sides of the harvester.

AU 2016/903873 (Applicant: Seed Terminator Holdings Inventor: Berry 2016) discloses a multistage hammer mill. Like the above it is mounted on the combine harvester behind the sieves. Rather than multiple rings of a circular array of stationary bars positioned at an angle to the rotation of a rotor it incorporates multiple rings of screens. Like a hammer mill, the rotor grinds, shears and impacts any seed in the chaff until it can pass through the screen aperture. The residue passes through multiple rings of stationary screens and rotating bars which inflict damage on any seeds in the chaff. The residue is then spread out to the sides of the harvester.

AU 2016/050802 (applicant: Tecfarm Inventor: Lewis 2016) discloses two parallel rotors with blunt flails radially extending on each rotor. It is shown that the effective tip diameters of the blunt flails are close to or intersecting each other. The rotors turn in opposing directions such that the tip velocity causes an impact zone between or near the intersecting flail tips and thus devitalization of seeds in the chaff occurs in this zone. The patent discloses the seed destruction device on a separate trailed unit however it is known that Tecfarm has mounted this type of destructor mill on a combine harvester at the rear end of the sieves.

The disclosure of each of the above cited patent documents is incorporated herein by reference. The concept herein can be used in any weed seed destructor design which uses a rotating body. In some cases the rotating body cooperates with a stator. The stator can include bars which deflect the seeds as they pass between the bars. The stator can include surrounding surfaces which cause the seeds to bounce back into the path of the rotor. In some cases the rotating body cooperates with another rotating body.

Preferably the weed seed destructor includes a common discharge with the first material.

Preferably the at least one weed seed destructor is arranged to expel the second material into a secondary spreading device.

Preferably the secondary spreading device comprises a tailboard with a plurality of fins.

Alternately the secondary spreading device could include powered spreading discs.

The shaft can comprise any one of the shafts of the combine harvester so that in one arrangement the rotor is a rear straw chopper; in another arrangement the rotor is an internal straw chopper; in another arrangement the rotor is an internal beater and in yet another arrangement the rotor is a dedicated shaft for the seed destructor only.

Preferably the weed seed destructor comprises at least one fan blade in the inlet for accelerating the weed seeds and chaff in the second material.

Preferably the fan blade creates enough airflow to spread both the first and second material.

Alternatively, additional fan blades can be attached to the straw side of the seed destructor rotor to provide additional airflow.

Alternatively, additional fan blades or blades with a larger effective frontal width than the leading edge can be mounted to the rotor to increase airflow.

Preferably the airflow accelerates both materials into the secondary spreading device.

Preferably the stator or stators comprises a plurality of stator bars at angularly spaced positions around the axis of the rotor where each stator bar extends axially along the axis of the rotor and being spaced from a next adjacent stator bar to provide an axially extending space therebetween through which weed seeds can pass; each stator bar comprising an elongate member which is U-shaped in cross-section to define a first leg lying in a cylindrical surface surrounding the axis of the rotor, a second leg extending outwardly from the cylindrical surface connected to a leading edge of the first leg at an apex at a leading end of the first leg relative to the direction of rotation of the rotor and a third leg extending outwardly from the cylindrical surface connected to a trailing edge of the first leg at an apex at a trailing end of the first leg relative to the direction of rotation of the rotor.

Typically the stator bars lie in a line parallel to the axis so that the apexes are directly parallel to the rotor axis. However the stator bars can be inclined to the line parallel to the axis at the cylindrical surface so that they are all tilted to the left or right. Where the bars are parallel to the axis, typically the second and third legs lie in an axial plane of the axis of the rotor.

Preferably the width of the first leg in the cylindrical surface is in the range 10 to 20 mm. Preferably the spacing between each bar and the next at the cylindrical surface lies in the range 10 to 50 mm. The width of the first legs relative to the spacing between the trailing edge of each bar and the apex of the next controls the amount of material which is allowed to escape between the bars. Increasing the length of the legs and/or decreasing the spaces increases the amount of material which remains inside the stator and thus increases the number of impacts and the power requirement for moving the material. Conversely the power can be reduced by increasing the proportion of space to leg but with consequent reduction in impacts and hence reduction in seed destruction. These ratios can be selected depending on the amount and type of seeds to be treated.

While the dimensions of the second and third legs in the outward direction have little effect on the operation, typically the width of the second leg in the outward direction is in the range 10 to 20 mm.

Preferably the outer edge of each of the second and third legs lies in a common imaginary cylinder surrounding said cylindrical surface as this makes the manufacture of symmetrical stator bars by bending sheet metal strips a more effective method.

Preferably the stator bars extend along a full height of rotor so that the height of the stator matches that of the rotor. However stators can be stacked one on top of another where the rotor is of increased height.

Preferably the legs of the stator bar comprise portions which are flat as this allows a simple bending of a flat strip to form the bars.

Preferably each of the stator bars comprises a sheet metal plate which is bent to form the legs. However other materials and methods of manufacture can be used.

Preferably the stator construction includes a stator support member and a plurality of angularly spaced stator portions mounted on the support member where the stator support member is cylindrical so as to surround the axis of the rotor and the stator portions are part cylindrical with each of the plurality of stator portions extending around a part only of the periphery of the support member. Each such portion includes a plurality of the stator bars.

This construction of separate replaceable stator portions allows a plurality of the stator portions to be provided having different characteristics which can be selected for different weed seed sizes and amounts. The selection of the portion also can be used to change power requirements.

In particular, the different characteristics or the portions to be used in any circumstance relate to the length of the first leg of the stator bars around the axis and/or the spacing between the stator bars around the axis.

This construction of part cylindrical stator portions allows the portions to be hard surface coated as a separate component from the support member.

Preferably there are provided rotor components between the inner and outer stators.

Preferably the rotor comprises a hub carrying rotor blades defining the rotor surfaces. In some cases the blades are pivotally mounted about an axis parallel to the rotor axis so as to act as flails. However the blades may also be fixed. More specifically, the blades of the primary are preferably fixed as they need to accelerate green or wet residue, where if the blades were pivoting they would swing by the green wads and tend to plug. Once the residue has been accelerated in the primary, the arrangement can utilize flails in the secondary.

Preferably the rotor comprises a plurality of blades where an outer surface of each blade has a leading edge which is closest to the cylindrical surface and tapers away from the cylindrical surface toward a trailing edge.

The user can set a predetermined balance between the seed kill rate and power requirements, both of which are dependent on the number of impacts and thus the ratio of the openings to bars in the stator.

The arrangements herein can use radiation including heat and/or light such as disclosed in the two references of Jackson cited above, the disclosures of which are incorporated herein by reference. The arrangements herein can use other modalities which reduce or remove the ability of the seeds to germinate including chemical materials applied generally of in a targeted manner to the weed seeds in the chaff.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
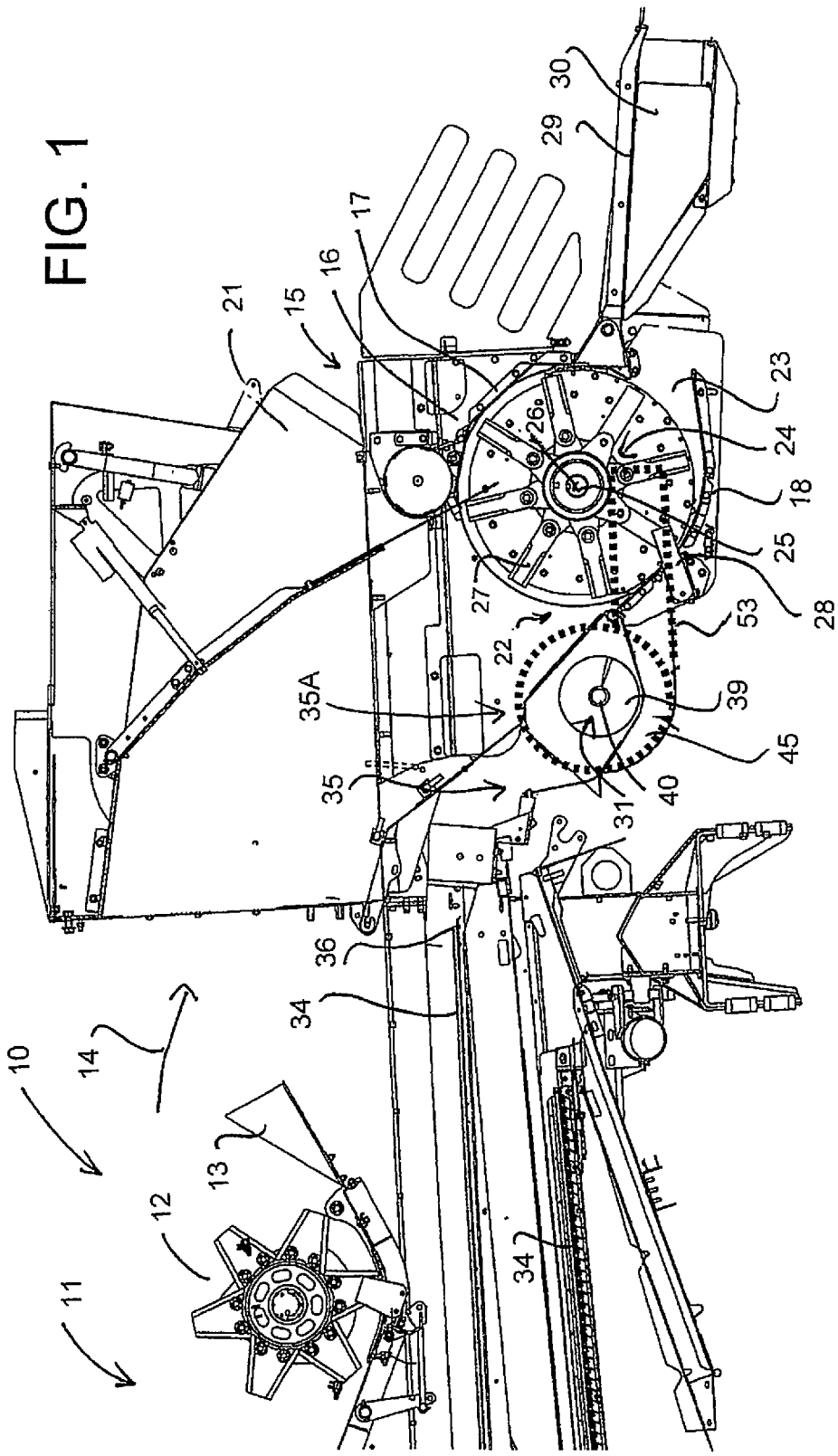
FIG. 1 is a side elevational view of a part of a combine harvester including an apparatus for destruction of weed seeds according to the present invention.

The apparatus herein is shown in FIG. 1 mounted on a combine harvester carried on ground wheels and including harvesting components of a conventional nature. This can include in some current embodiments a conventional separator with straw walkers with a threshing cylinder axis perpendicular to the direction of travel, in other embodiments using an axial separator with a rotor axis aligned with the direction of travel and in other embodiments using aligned threshing rotors perpendicular to the direction of travel. Other arrangements are also possible.

In most embodiments, the rearmost part of the separation system is the sieve which allows passage through of harvested seeds for collection and discharges chaff and discarded seeds including weed seeds to the rear edge of the sieve.

Thus the separation system including the threshing system and the cleaning system defined by the sieves operates for separating harvested crop into a first material comprising straw and a second material comprising chaff and weed seeds.

The combine harvester 10 shown in FIG. 1 includes a separating rotor prior to the location 11 feeding the straw onto a beater or internal straw chopper rotor 12 which completes a further and final separation before the first material containing the straw is discharged from the separation system at location 13 into a straw path 14 for passage to a discharge from the combine harvester.

The combine harvester as shown includes a chopper and discharge arrangement 15. The chopper thus comprises a housing 16 defined by a top wall 17, a bottom wall 18 and two end walls 19. The end walls 19 include attachment flanges 20 for attachment of the housing 16 to the outlet hood 21 of the combine harvester for discharge of straw and optionally chaff from the combine harvester into an inlet opening 22 of the housing 16. The bottom wall 18 defines a semi-cylindrical portion extending from the inlet 22 to an outlet 23 through which chopped straw and air is discharged at relatively high velocity for spreading across the field in a wide spread pattern.

Within the housing is mounted a hub 24 including a shaft 25 which is carried on suitable bearings for rotation about a generally horizontal hub axis 26 at a center of the housing. The shaft 25 can form a complete shaft body across the full width or it may be formed from stub shaft portions (not shown) attached to the hub 24 at each end. Blade members 27 carried by the hub 24 sweep around within the housing to entrap straw fed through the inlet 22 and to carry the straw and air past stationary blades 28 for chopping and for discharge through the outlet 23. The stationary blades 28 are mounted on the housing at a position approximately midway between the inlet 22 and the outlet 23 so that blade members 27 carried on the hub sweep between the stationary blades in a cutting action.

The chopper and spreading assembly 15 is arranged to be mounted at a rear straw discharge of the combine harvester and includes the housing 16, the rotor 24 mounted in the housing 16 for rotation around a generally horizontal axis 26 and carrying the plurality of chopper blades 27 for chopping the discharge material.

At the exit 23 is provided the material spreading assembly which can be the form of a tailboard 29 with guide fins 30 for receiving the chopped material and spreading the material to the rear and sides of the combine harvester.

The separation system of the combine harvester further includes one or more sieves 34 of well known construction where grain passes through for collection and chaff and weed seeds are discharged from the rear end 36 of the sieves at a discharge location 35.

In this embodiment a seed destructor is provided which includes two separate destructor elements 33 one on each side of the housing 15. Each destructor element comprises a primary mill component or primary destructor 31 and a secondary mill component or secondary destructor 32 connected sequentially so that the primary destructor 31 acts on the chaff and weed seeds from the sieve in a first action and then the material is transferred to the secondary mill component 32 where a further milling action is carried out to complete the necessary operation on the weed seeds including seed impacts to devitalize the weed seeds.

Figure 2:
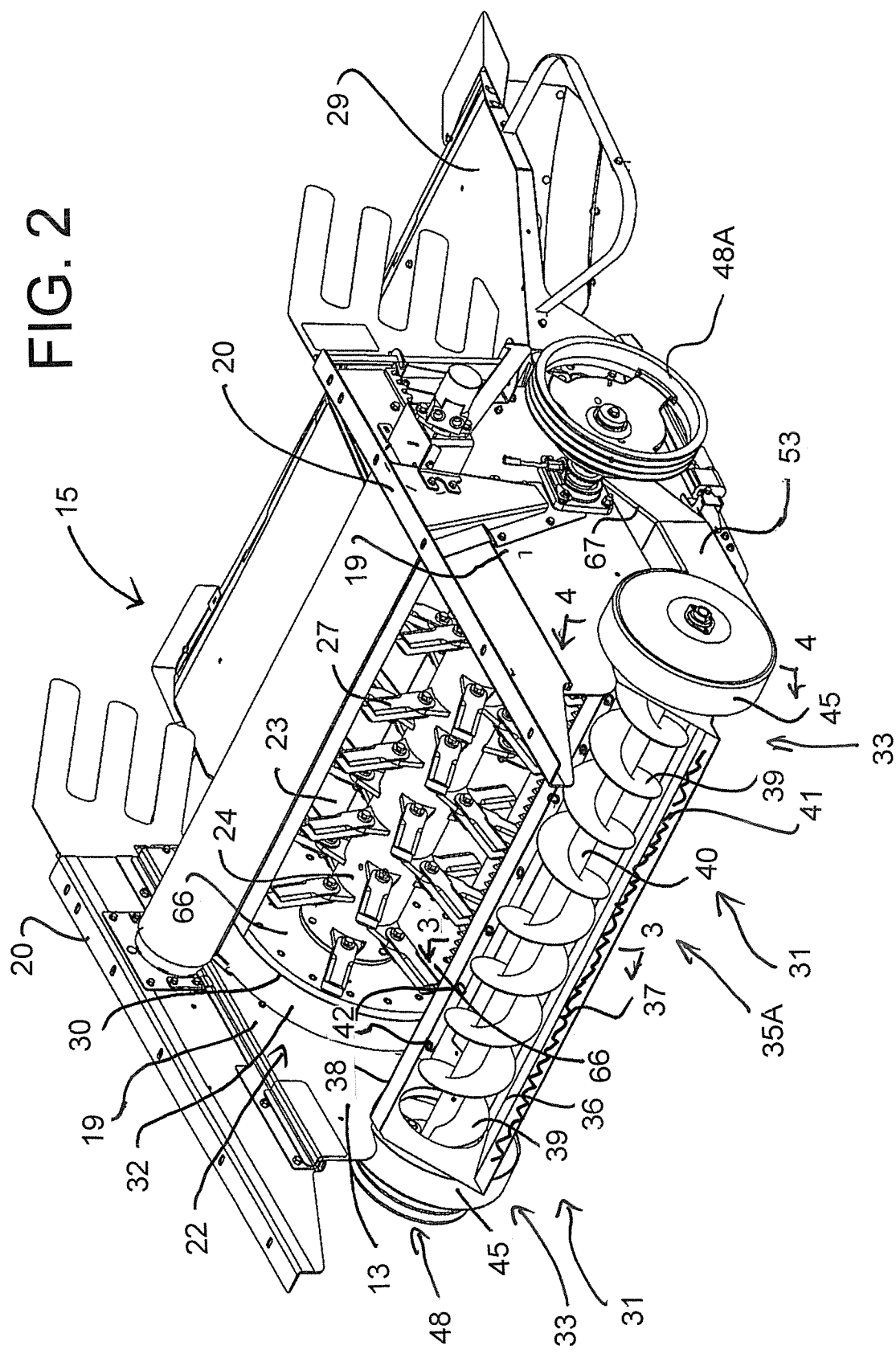
FIG. 2 is an isometric view of the apparatus for destruction of weed seeds of FIG. 1 showing one embodiment where the primary destructor uses radiation at the transfer arrangement.
Figure 3:
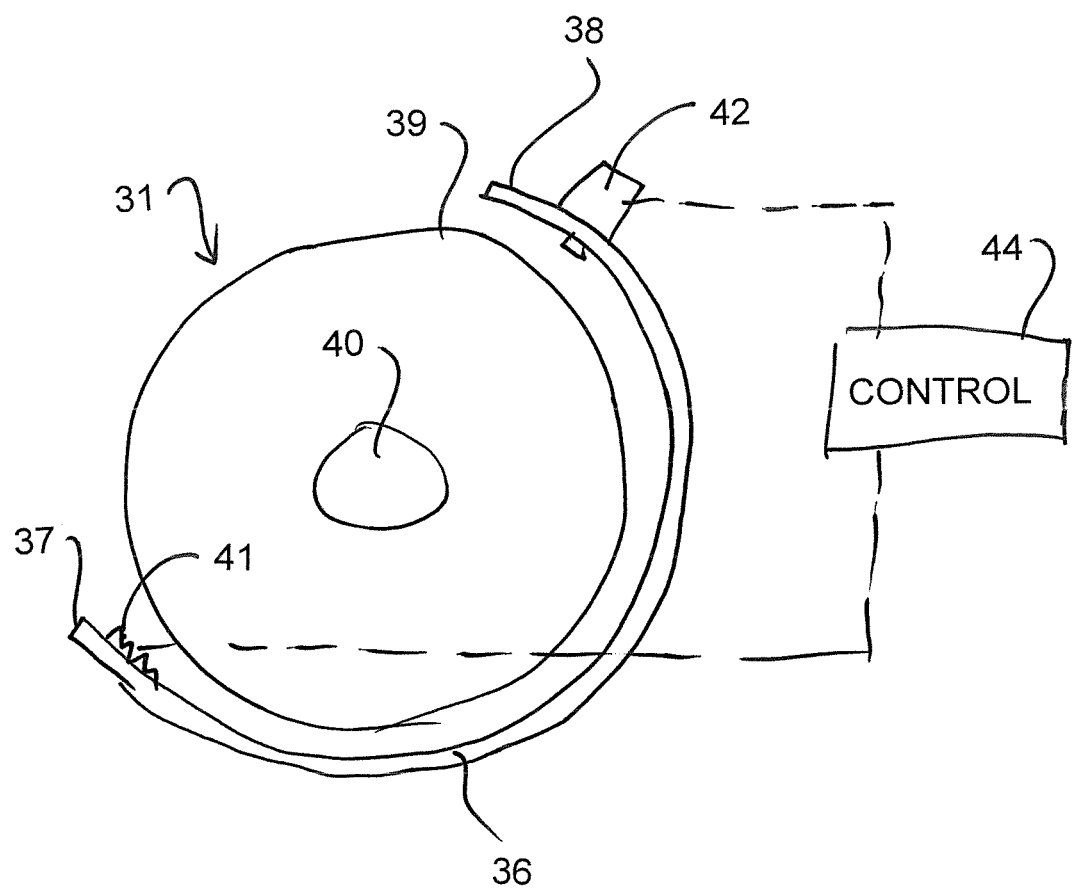
FIG. 3 is a cross sectional view along the lines 3-3 of FIG. 2 showing the primary destructor of the first embodiment in the transfer member at the rear of the sieve.
Figure 4:
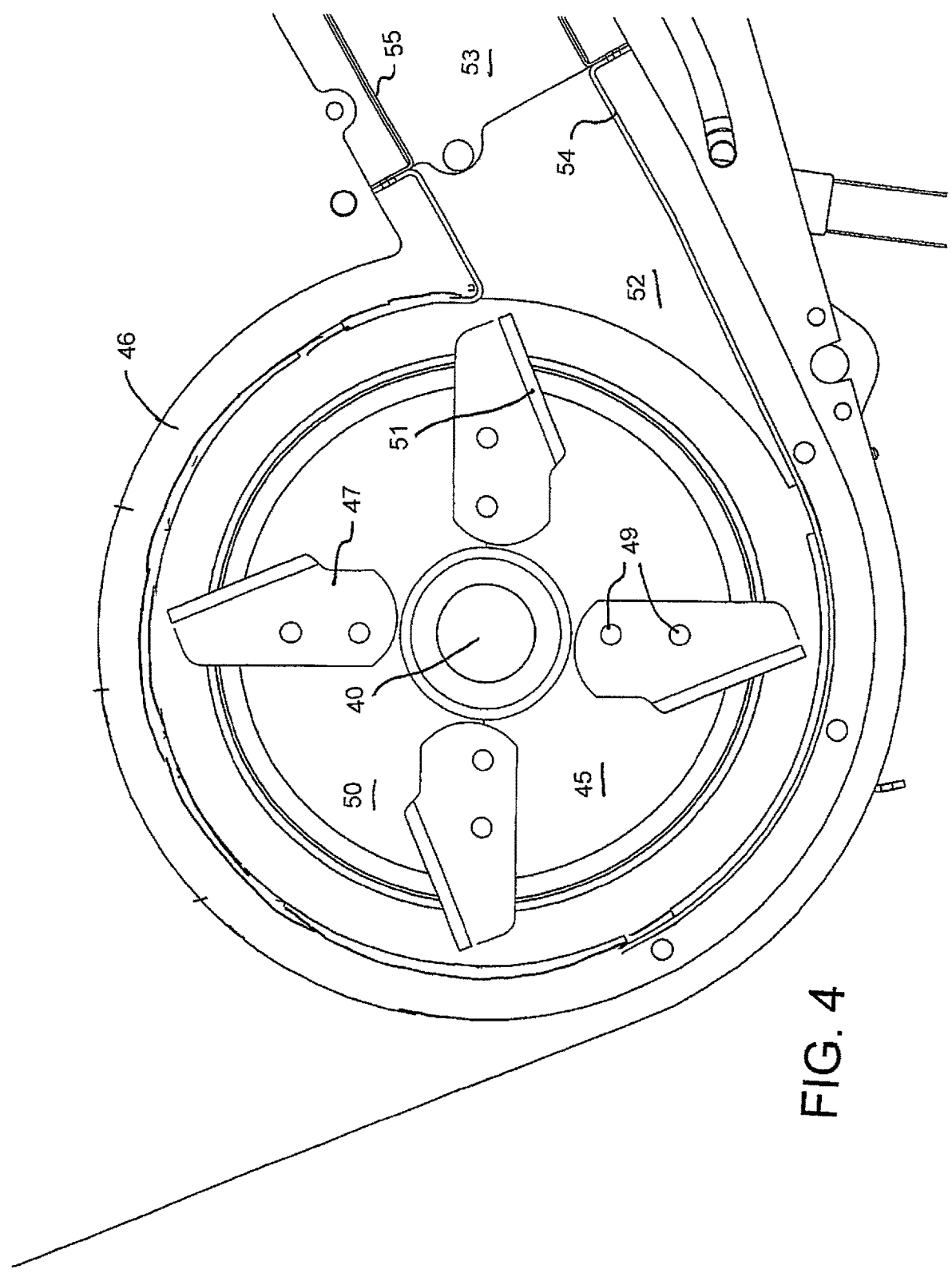
FIG. 4 is a cross sectional view along the lines 4-4 of FIG. 2 showing the fan components which form part of the transfer arrangement carrying the material after the primary destructor of the first embodiment to the secondary destructor.

Turning firstly to the embodiment shown in FIGS. 2, 3 and 4, this embodiment uses as the second element or milling component 32 an impact system including a rotor and stator arrangement for generating multiple impacts on the weed seeds. An arrangement of this type is shown and described in the above cited published application US 2020/0296896 published Sep. 24 2020 by the present applicant. Further description is included hereinafter.

The primary destructor is of an arrangement wherein the components of the primary destructor are different from and function differently from the components of the secondary destructor. In this way, the components of the primary destructor are different from the components of the second destructor so that a number of seeds devitalized in the primary is different from that in the secondary. That is the primary and secondary may be selected so that they are complementary where one provides a first action on some of the seeds and the second provides a second action on others of the seeds so that a greater total of the seeds is devitalized.

In this embodiment, the primary and secondary destructors use different devitalization modalities. That is the primary destructor uses in this embodiment a modality other than seed impacts. Thus in this embodiment the primary destructor uses radiation applied to the seeds. This can simply be a source of electromagnetic radiation at a determined intensity and spectrum and wavelength. The electromagnetic radiation applied to the seeds can be visible light. The electromagnetic radiation in the embodiment shown includes heat and light which can be at a visible wavelength. However other modalities can be used including chemical materials. Also as described hereinafter, an impact system can be used.

As shown best in FIG. 2, there is provided a transfer system generally indicated at 35A to move the second material including the weed seeds from the second discharge location 35 from the sieve 34 to the primary destructors 31 of the weed seed destructor section before passing to the secondary destructors 32. The transfer system 35A comprises a transverse duct 36 which forms a channel at the rear of the sieve so that the material enters an open mouth of the duct 36 defined between a leading edge 37 of the duct 36 and a trailing edge 38 of the duct. The duct is part cylindrical so as to surround and contain an auger flight 39 on a shaft 40. The flight is separated at the middle so as to carry material from the center toward each end of the duct 36 as the auger flight rotates.

The housing or duct 36 for the auger flighting is designed so that the bottom of the housing is not tight to the auger flighting 39. The high speed of the auger flighting acts to drive any heavy objects, rocks or metal, into the void which thus acts as a rock trap allowing the auger to only move the lighter chaff to the ends.

The primary destructor arrangement comprises the two primary destructors 31 each cooperating with a respective part of the flight 39. The primary destructor sections 31 each include radiation emitting elements including a radiant heating element component 41 and a light emitting component 42 operated as shown in FIG. 3 by a control system 44. The heating element and the light emitting component are both mounted on the duct 36 at suitable locations. As shown the heating element 41 comprises a radiant heating element heated for example by resistive heating and is on the inside of the duct adjacent the leading surface 37. As shown the light emitting elements comprise a plurality of LEDs mounted through the wall forming the duct 36 at spaced positions along the duct 36. In the embodiment shown these are located adjacent the rear edge 38 of the duct.

In this way the chaff and weed seeds are dropped into the duct 36 though its open mouth and are carried along the duct toward the ends by the flight 39. As the chaff is very light, it tends to be opened up by and carried around the flight so that the material is fluffed up in the duct to expose all parts to the radiation as the material floats around the auger and moves toward the ends. This tends to expose the weed seeds at various locations within the chaff as the chaff turns, rolls and mixes within the flight.

The combination of the heating of the weed seeds in the chaff and the application of light to the weed seeds acts to devitalize the weed seeds as they travel along and within the transfer arrangement. It is known that the effects of the heat and light has different levels of devitalization depending on the characteristics of the seeds.

At each end of the flight 39 is provided the respective fan arrangement 45 located in a cylindrical housing 46. This is best shown in FIG. 4 and includes fan blades 47 driven by the shaft 40 of the auger. The shaft 40 is driven by a belt drive system 48 from the shaft 24 of the chopper 15 which is driven by a belt drive system 48A from the output drive shaft of the combine harvester.

The fan 45 shown in FIG. 4 comprises the plurality of fan flails 47 each fixed to a mounting plate 50 by bolts 49 and including a fan blade surface 51 so that rotation of the shaft 40 around its axis of the shaft 40 acts to drive the material from the sieve radially outwardly from the axis. The blades are fixed rather than pivotal to ensure that plugs of material are fed through which may not occur if the blades can pivot.

A housing 46 includes a discharge opening 52 in the peripheral wall connected to a transfer duct 53 defined by a tangential wall 54 and a wall 55 parallel to that wall. Thus the fan section 45 is defined by the fan blades so that air and the entrained material is directed outwardly into the transfer duct 53 for discharge of the feed material after the treatment by the heat and light, or other modality, causing the initial devitalization in the sections 31.

The ducts 53 extend along the outer face of the housing 16 of the chopper and discharge the second material after treatment through an opening in the end wall to enter at the secondary destructor 32 described hereinafter.

Turning now to the second embodiment shown in FIGS. 5 to 8, there is shown the arrangement which uses an impact modality for the primary destructor section. Thus on each side the destructor element 33 comprises a primary mill 60 and the secondary mill shown at 32 as described in detail hereinafter. The secondary components are positioned on the shaft 25 of the hub 24 at the respective ends.

Figure 5:
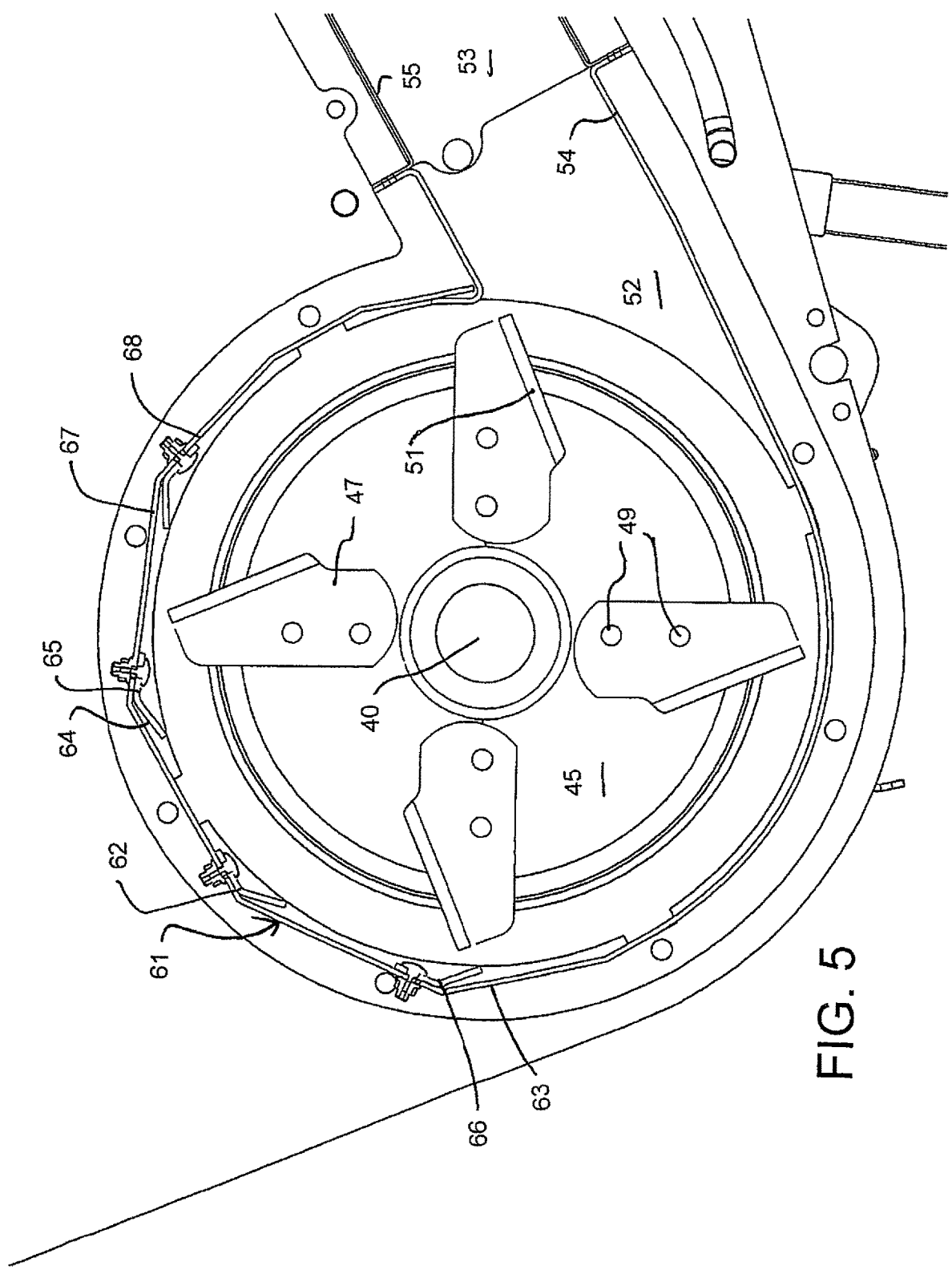
FIG. 5 is an isometric partly broken view of one end of the housing including one primary rotary mill and the duct leading from the primary mill to the secondary mill showing a second embodiment which uses an impact arrangement as the primary destructor.
Figure 6:
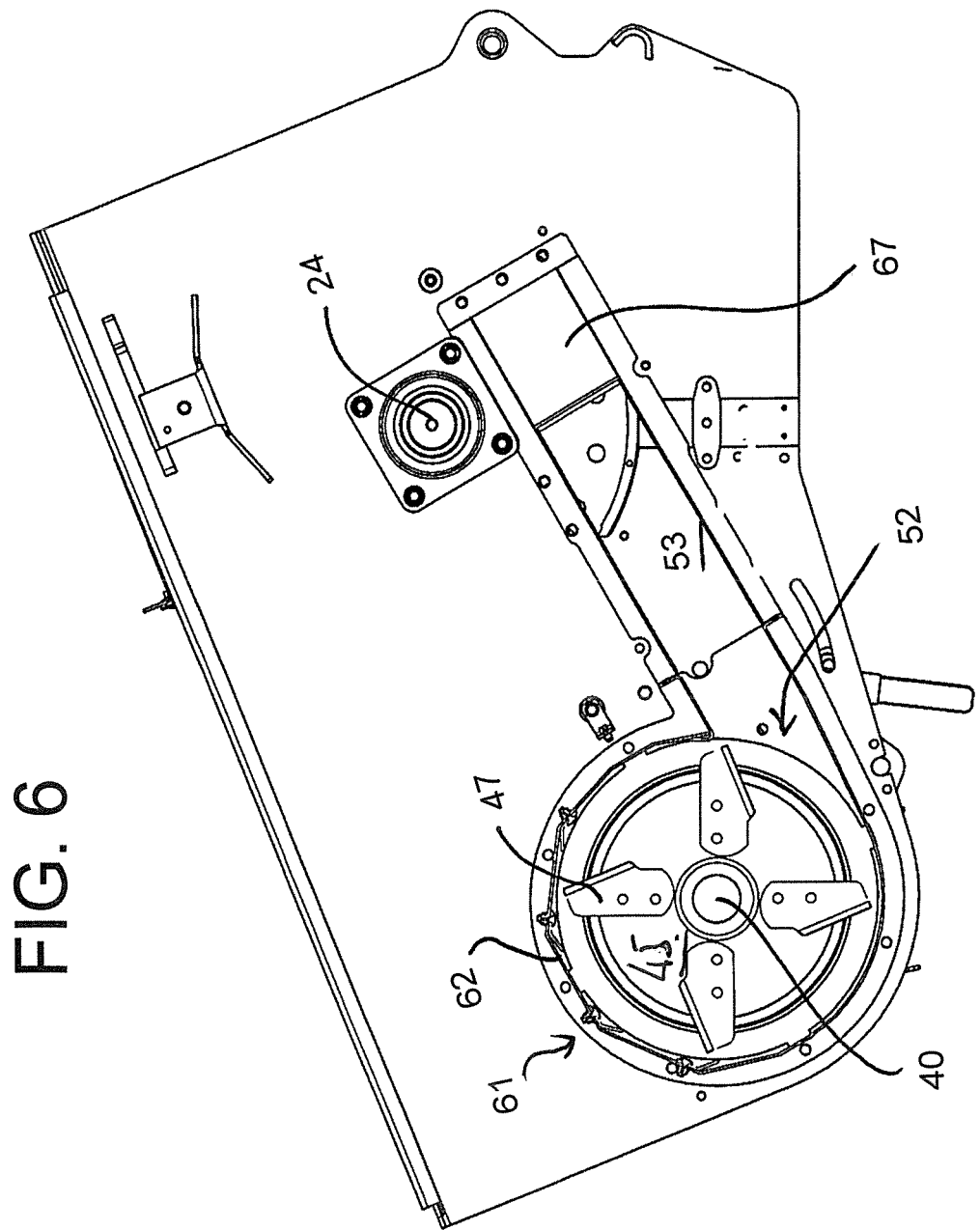
FIG. 6 is an end elevational view of the housing and primary mill of the embodiment of FIG. 5.

The primary destructor 31 as shown in cross-section in FIG. 5 comprises a stator 61 around the same rotor 45 which acts as the fan in the first embodiment. The stator 61 is defined by the inside surface of the polygonal housing.

The rotor 45 comprises a plurality of rotor flails 47 each fixed to a mounting plate by bolts 49 and including the fan blade surface 51 so that rotation of the rotor around its axis of the shaft 40 acts to drive the material from the sieve radially outwardly from the axis. The blades are fixed rather than pivotal to ensure that plugs of material are fed through which may not occur if the blades can pivot.

The stator 61 is arranged at a location centrifugally outside the rotor 45 so that the material and discarded seeds thrown outwardly impact on the stator 61. The stator 61 also includes, as parts thereof, a series of stator surface elements 62 for engaging the discarded seeds in the accelerated material. The stator surface elements 62 are arranged such that the discarded seeds impact thereon and rebound therefrom back toward the rotor 45.

Thus the rotor 45 and stator 61 are arranged such that the discarded seeds rebound back and forth between the rotor 45 and the various parts of the stator 61 to provide a plurality of impacts on the feed material to destroy or devitalize some of the seeds.

As the air and entrained material passes outwardly after less than 360 degrees of rotation, the discarded seeds discharge from the rotor and do not pass or escape outwardly through the stator 61. That is, in the impact section, the various parts of the stator 61 substantially wholly surround the rotor 45 to prevent the seeds from escaping radially. That is all of the seeds are rebounded back inwardly to the rotor and move toward the outlet while rebounding back and forth until they pass out of the impact section through the discharge opening 52 into the transfer duct 53.

Thus the rotor 45 rotates around the axis so as to direct the discarded seeds centrifugally outwardly. The various parts of the stator 61 surround the axis so as to rebound the discarded seeds back toward the axis and the discharge opening 52 is arranged such that the discarded seeds discharge generally radially outwardly from within the stator 61. In this way, the feed material containing the discarded seeds enters the housing axially of the rotor 45 at the inner end face of the rotor and discharges radially from the bottom end of the rotor into the transfer duct 53.

As best shown in FIG. 5, each of the stator surface elements 62 comprises a generally V-shaped body, and more specifically, each stator surface element 62 carries as part of the stator surface element 63 two individual seed engaging surface portions in the form of respective walls 64 and 65 which converge to an apex 66 parallel to the axis and located outwardly of the surfaces 64 and 65. The surfaces lie at an angle to a tangent to the peripheral wall 61. The plurality of stator surface elements 62 is arranged so that the elements 62 are angularly spaced around the axis. As shown, there are four elements 62 over a region of the peripheral wall 61 generally opposite to the discharge opening 52 and thus representing the working area of the destructor where the material is impacted. It will be noted that the individual seed engaging surface portion 64, 65 against which the seeds are primarily directed as the rotor 45 turns counter clockwise is arranged at an angle to a tangent T of an imaginary cylindrical surface surrounding the axis. Thus the seed engaging surface portion 64 is inclined forwardly and inwardly so that the seeds moving with the rotor and outwardly of the rotor impact against the seed engaging surface portion 65 and are rebounded inwardly. The stator surface element 62 may be adjustable to change the level of aggression in the rebound action.

The elements 62 are formed from sheet metal bent at the apex 66. This forms the wall 65 into a long sheet which extends around the axis to the next element and defines the inside surface of the housing and thus the peripheral wall 61. The long sheet 67 includes an end receptacle 68 which engages around the surfaces 64, 65 of the next adjacent element.

The stator 61 has an overall cylindrical shape and there are four of the stator surface elements 62 at angularly spaced positions leaving the remainder of the inner surface of the stator housing 61 exposed to act as a further stator surface. This further stator surface surrounds the whole of the rotor apart from the discharge opening and hence prevents outward escape of any material, thus confining the material to move to the discharge opening 52 for ejection.

Figure 7:
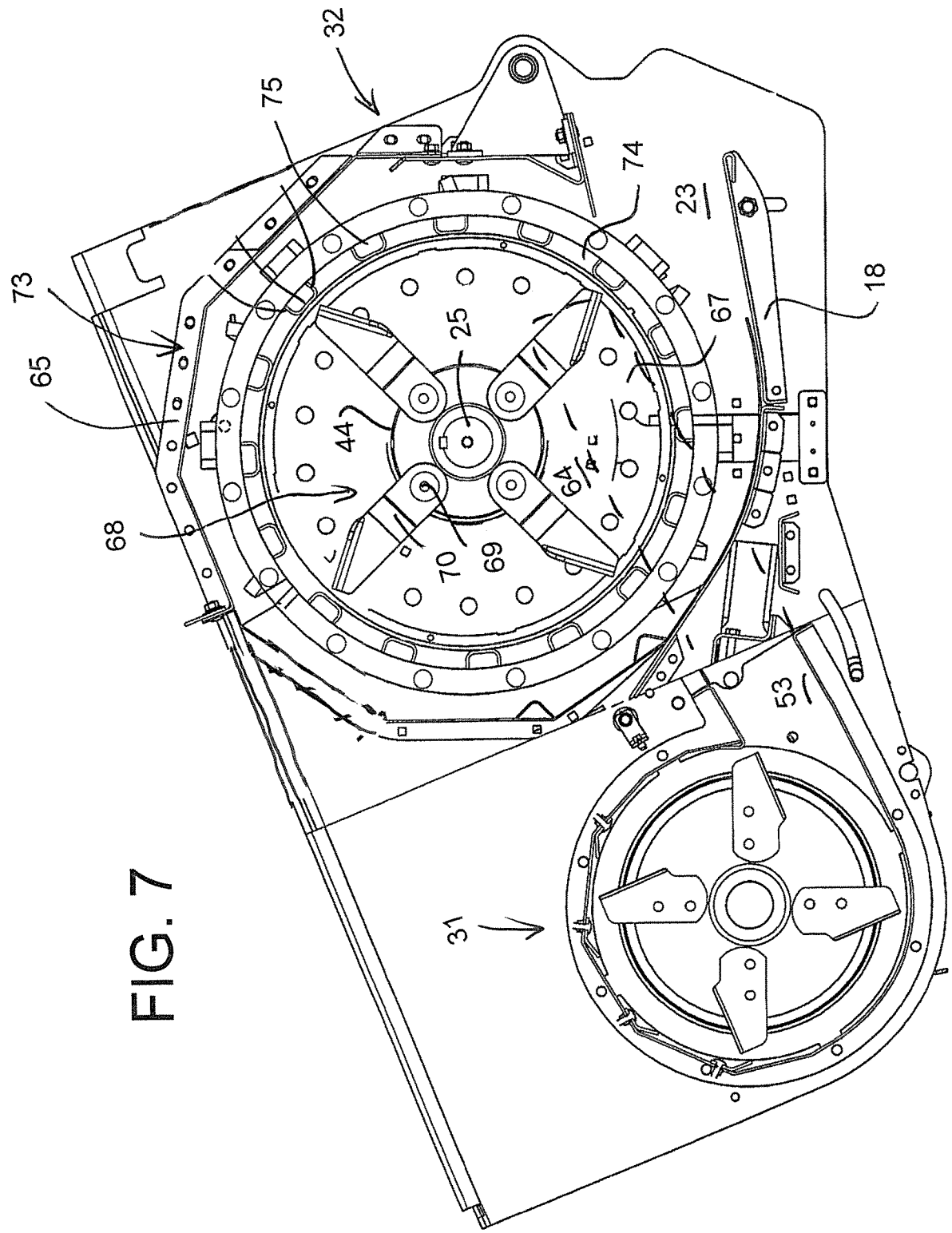
FIG. 7 is an end elevational view of the primary and secondary mills of the second embodiment of FIGS. 5 and 6.
Figure 8:
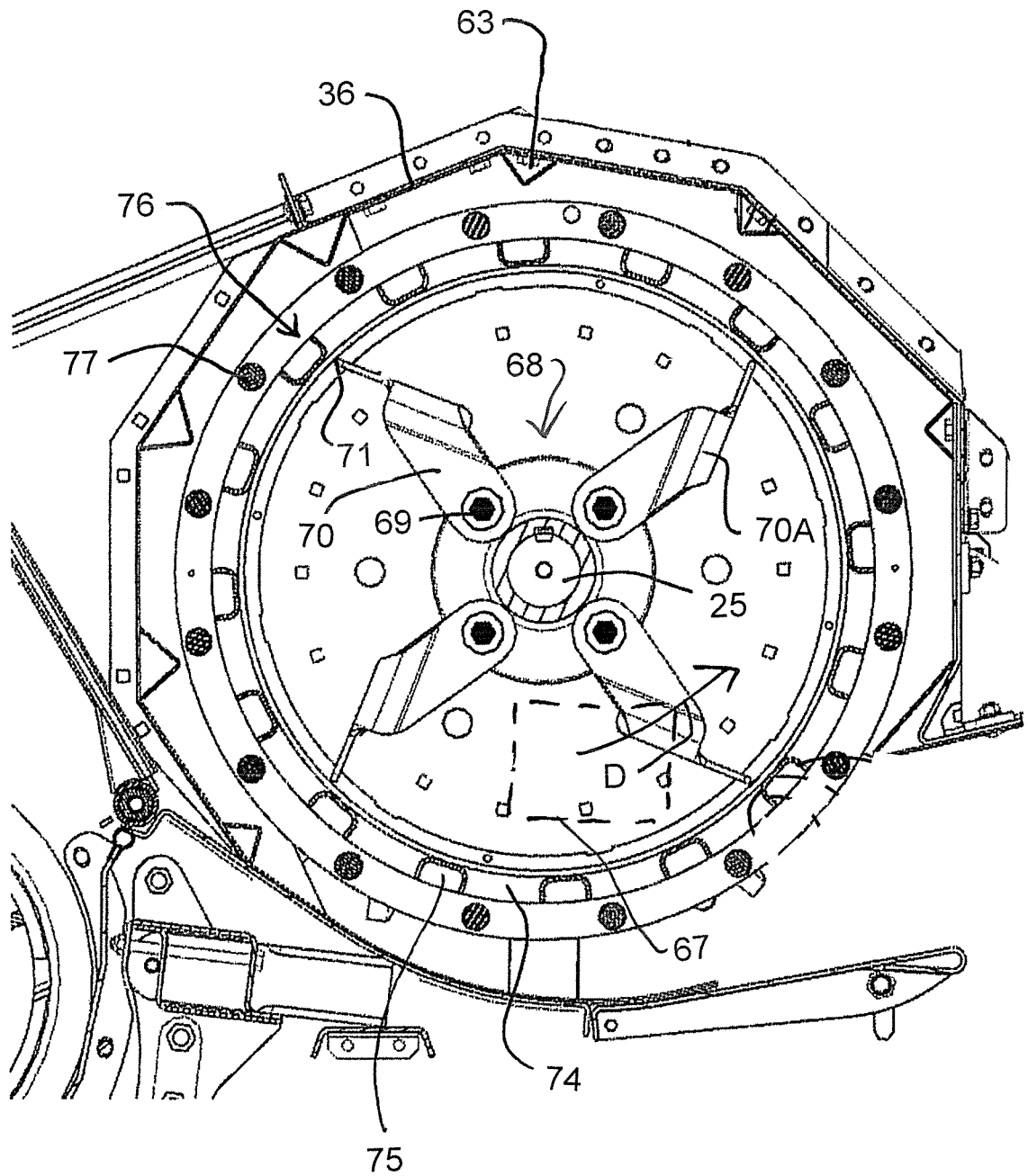
FIG. 8 is a cross-sectional view of the secondary mill of FIG. 7 of the second embodiment.

Each secondary destructor 32 as best shown in FIGS. 7 and 8 comprises a housing 73 with a base wall 731 at or defined by the end panel 19 of the housing 16. The base wall 731 and a generally cylindrical outer surface 732 are covered by a second end wall 733 (FIG. 2) parallel to and spaced inwardly from the end wall 731 at the end panel 19. The end wall 731 at the end panel 19 of the housing is held stationary and includes an inlet opening 734 for feeding the second material from the transfer duct 53 onto a rotor 735 mounted on the shaft 25 of the hub 24. Around the shaft 25 is provided a plurality of pivot pins or bolts 69 each carrying a pair of flail blades 70. The flail blades extend from an inner end with a plurality of fingers extending into connection to the pin 69. An outer end of the flail blade 70 broadens in the axial direction of the axis of the hub 24 and terminates in an edge 71 lying in an imaginary cylindrical surface surrounding the axis. The flails can retract inwardly by pivotal movement in the event of impact with a larger object. Thus the blades 70 are pivotally mounted about an axis parallel to the rotor axis so as to act as flails. Also each of the rotor blades may include a sharpened cutting edge radial to the axis and a fan blade portion 70A generally axial of the axis. The fan blades 70 of the mill act to generate a significant air flow through the mill to the outlet 23 of the mill. The outlet 23 directs the outlet air onto the tailboard 29 and the fins 30 thereon to supplement the stream of air and straw from the blades 27 of the straw chopper. In this way the mills act in the same manner as the fan blade sections shown in the above cited U.S. Pat. No. 6,840,854 of Redekop. It will be appreciated therefore that the addition of the stator portions of the mill to the fan end sections of the straw chopper rotor enable the straw chopper to carry out both functions of straw chopping and milling the chaff together with the spreading of both materials. This provides a system of high efficiency with low numbers of moving parts to enable the construction of a device at lower cost.

Around the rotor is provided a stator formed by the inner surface 732 of the housing 73 and a single stationary annular coaxial cylinder 74. The stator cylinder 74 is carried on the stationary end wall 733 so that they project axially into the rotor 735. The second end wall 731 forces the weed seeds to contact the stator ring 74 and rotor 735 to be impacted thereby thus devitalizing the seed.

In operation, the rotor flails 70 act to suck chaff and weed seed into the mills through the inlet opening 734 in the end wall 731 and accelerate and direct the material across the inside surface of the inner stator ring 74 to impact, shear and force some of the material through the spaces between bars 75 of the ring 74. The outer edge 71 of the flail blade 70 thus acts to wipe the material cross the inside surface of the inner stator ring 74 with the edge 71 having a height substantially matching the height of the bars 75.

The material sliding on the inside surface of the inner stator ring 74 thus can escape through the inner stator ring 74 to the outer annular stator 732 defined by the housing 73. Between the two stators 732 and 74 is an annular rotor 75 defined by ring 76 of posts 77 which are attached to a base plate of the rotor so as to rotate with the shaft 25 of the center hub 24 and with the flail blades 70 attached to the shaft. These posts 77 act to impact, accelerate and shear the material round the inside surface of the outer stator 732.

The arrangement herein thus provides one stator ring 74 comprising a plurality of stator bars 75 at angularly spaced positions around the axis of the rotor. Each stator bar 75 thus extends axially along the axis of the rotor and is spaced from a next adjacent stator bar to provide an axially extending space therebetween through which weed seeds can pass.

The construction and shape of the stator bars 75 is as shown in US published application US2020/0107502 published Apr. 9, 2020 by the present applicant.

The rotor shaft 24 and the transfer system 35A are both driven by a belt for receiving drive from an output shaft of the combine harvester so that there is a common drive from the combine harvester to the chopper rotor of the straw chopper section and the shaft 40 of the transfer system. Alternately the low power requirement for the transfer device 33 allows the device to be driven by a hydraulic motor to provide the simple command afforded by electro-hydraulic controls.

It will be noted from FIG. 1 that the transfer system 35A has an intake in front of a housing of the rotor of the chopper 15 with the housing 36 being mounted on or as part of the housing of the straw chopper rotor.

Thus the transfer system 33 includes the auger flight arrangement for moving the second material outwardly to one or both sides of the combine harvester to the primary destructors and transfer duct to convey the second material to the secondary rotor seed destruction section.

The weed seed destructor apparatus described herein thus comprises a separation system 11, 34 for separating from harvested crop a first material including straw and a second material including chaff and weed seeds. The weed seed destructor apparatus includes a primary destructor 31 arranged to receive the second material.

The secondary destructor 32 is arranged to receive the second material from the primary destructor and includes a secondary rotor 44 mounted for rotation about an axis and including rotor surfaces thereon for engaging and accelerating the second material.

The secondary stator defined by the inner surface 732 of the housing 73 and the ring 74 is mounted for engaging the weed seeds to cause a plurality of impacts on the weed seeds between the secondary rotor 735 and the secondary stator.

The primary destructor 31 has a discharge outlet 52 connected to the transfer duct 53 which communicates to the feed inlet 734 of the secondary destructor.

The transfer duct 53 carries at least some of a discharge from the primary destructor so as to enters the feed inlet of the secondary destructor. It will be appreciated that in some cases a single primary may feed two or more secondaries so that only a part of the discharge is carried to a secondary.

The arrangement shown is particularly effective in that the secondary destructors 32 are mounted in the chopper housing 16 without significantly increasing the width of the structure. That is the chopper rotor remains of the same width as the straw path. Only the fans of the primary destructors 31 and the associated transfer ducts 53 are mounted outside the width of the chopper housing. Alternatively, the fans and primary destructors could be mounted in the same plane as the secondary destructor rotors so that only the transfer ducts 53 are outside the chopper width utilizing a narrow configuration and a small amount of space on the combine harvester.

Also the secondary weed seed destructors 32 generate an air flow volume and rate somewhat similar to that of the conventional fans of the conventional Redekop chopper (of the type shown in the abovementioned patent) so that the total volume of air generated and fed onto the tail board with the combined first and second materials for spreading is equal to or even greater than that of the conventional chopper.

The secondary destructors 32 are located in the separate sections at the ends of the chopper rotor so that they do not interfere with the conventional straw chopping action of the rotor.

The secondary destructors 32 are arranged to expel the second material into a secondary spreading device. In the embodiment shown this is the tailboard. However other arrangements may use a rotary spreading system. This can be used where the air flow is insufficient to generate the required spread such as where the straw chopping section is internal to the combine rather than the dedicated rear chopper shown.

In the embodiment shown, the shaft 24 driving the secondary destructors 32 is the shaft of the rear straw chopper so that the transfer system and primary destructor can be mounted in front of the chopper housing. However in an arrangement where there is no rear straw chopper, or there is no efficiency in mounting the secondary destructors 32 to the rear chopping rotor, the shaft mounting the secondary destructors 32 can be the shaft of the internal discharge beater of the combine. Again the secondary destructors 32 can be located with two end annular members on the shaft of the beater within the width of the combine housing. Also a single destructor can be mounted on the beater at one end in which case the secondary destructor may be outside the housing.

In yet another arrangement the secondary destructor or destructors 32 is mounted to the shaft of an internal straw chopper. In both these cases, again the second material can be collected by an auger and primary destructor arrangement but the transfer ducts extend forwardly to a location at the respective cross shaft within the combine.

In yet another arrangement the secondary destructor 32 is mounted to an independent cross shaft.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A combine harvester comprising:
    a separation system for separating from harvested crop a first material including straw and a second material including chaff and weed seeds;
    the separation system including at least one sieve at a rear end of which the second material is discharged;
    a first material discharge system defining a first path for the first material including a straw chopper for the first material;
    a rotary transfer member mounted at a rear of the sieve and rotatable about an axis along the rear edge and arranged to carry the second material along the axis;
    and a weed seed destructor apparatus located in a second separate path for the second material including chaff and weed seeds;
    the weed seed destructor apparatus being mounted on the combine harvester at a location to receive the second material in the second separate path from said at least one sieve;
    the first and second paths being arranged such that the first material passes to the straw chopper and the second material passes to the weed seed destructor apparatus while by-passing the straw chopper;
    the weed seed destructor apparatus comprising:
        a primary destructor having one or more components acting on the weed seeds so as to cause devitalization of at least some of the weed seeds;
        a secondary destructor arranged to receive the second material from the primary destructor, the secondary destructor having one or more components acting on the weed seeds so as to cause devitalization;
    wherein the primary destructor is mounted at the rotary transfer member.

2. The combine harvester according to claim 1 wherein said one or more components of the primary destructor are different from said one or more components of the secondary destructor so that a number of weed seeds devitalized in the primary destructor is different from that in the secondary destructor.

3. The combine harvester according to claim 1 wherein the primary and secondary destructors use different devitalization modalities.

4. The combine harvester according to claim 1 wherein the secondary destructor uses a rotor and stator arrangement for generating multiple impacts on the weed seeds.

5. The combine harvester according to claim 1 wherein the primary destructor uses electromagnetic radiation applied to the weed seeds.

6. The combine harvester according to claim 5 wherein the electromagnetic radiation includes heat and light.

7. The combine harvester according to claim 1 wherein the rotary transfer member is part of a transfer arrangement at the rear edge of the sieve arranged to transfer the second material and including fan blade members on the rotary transfer member for expelling the second material.

8. A combine harvester comprising:
    a separation system for separating from harvested crop a first material including straw and a second material including chaff and weed seeds;
    the separation system including at least one sieve at a rear end of which the second material is discharged;
    a first material discharge system defining a first path for the first material including a straw chopper for the first material;
    and a weed seed destructor apparatus located in a second separate path for the second material including chaff and weed seeds;
    the weed seed destructor apparatus being mounted on the combine harvester at a location to receive the second material in the second separate path from said at least one sieve;
    the first and second paths being arranged such that the first material passes to the straw chopper and the second material passes to the weed seed destructor apparatus while by-passing the straw chopper;
    the weed seed destructor apparatus comprising:
        a primary destructor having one or more components acting on the weed seeds so as to cause devitalization of at least some of the weed seeds;
        a secondary destructor arranged to receive the second material from the primary destructor, the secondary destructor having one or more components acting on the weed seeds so as to cause devitalization;
    wherein the primary destructor comprises a rotary member mounted along a rear of the sieve and rotatable about an axis parallel to the rear edge.

9. The combine harvester according to claim 8 wherein said one or more components of the primary destructor are different from said one or more components of the secondary destructor so that a number of weed seeds devitalized in the primary destructor is different from that in the secondary destructor.

10. The combine harvester according to claim 8 wherein the primary and secondary destructors use different devitalization modalities.

11. The combine harvester according to claim 8 wherein the secondary destructor uses a rotor and stator arrangement for generating multiple impacts on the weed seeds.

12. The combine harvester according to claim 8 wherein the primary destructor uses electromagnetic radiation applied to the weed seeds.

13. A combine harvester comprising:
- a separation system for separating from harvested crop a first material including straw and a second material including chaff and weed seeds;
- the separation system including at least one sieve at a rear end of which the second material is discharged;
- a first material discharge system defining a first path for the first material including a straw chopper for the first material;
- and a weed seed destructor apparatus located in a second separate path for the second material including chaff and weed seeds;
- the weed seed destructor apparatus being mounted on the combine harvester at a location to receive the second material in the second separate path from said at least one sieve;
- the first and second paths being arranged such that the first material passes to the straw chopper and the second material passes to the weed seed destructor apparatus while by-passing the straw chopper;
- the weed seed destructor apparatus comprising:
  - a primary destructor having one or more components acting on the weed seeds so as to cause devitalization of at least some of the weed seeds;
  - a secondary destructor arranged to receive the second material from the primary destructor, the secondary destructor having one or more components acting on the weed seeds so as to cause devitalization;
- wherein the primary destructor comprises a rotary member mounted along a rear of the sieve and rotatable about a rotary axis parallel to the rear edge;
- wherein the rotary member of the primary destructor carries a plurality of rotor impact members which rotate with the rotary member for impacting the weed seeds in the second material;
- and wherein the primary destructor includes a stator having a surface surrounding the rotary member which carries surface elements thereon projecting therefrom and shaped for engaging the weed seeds in the second material.

14. The combine harvester according to claim 13 wherein the stator of the primary destructor defines a housing surrounding the rotary member of the primary destructor with a discharge opening in the housing which is tangential to the rotary member and arranged to direct the second material toward the secondary destructor.

15. The combine harvester according to claim 13 wherein the plurality of rotor impact members each comprise a fan blade surface extending longitudinal of the rotary axis.

16. The combine harvester according to claim 13 wherein the plurality of rotor impact members each comprise a flail.

17. The combine harvester according to claim 13 wherein the secondary destructor comprises a secondary rotary member rotatable about a secondary rotary axis parallel to the rotary axis which carries a plurality of rotor impact members which rotate with the secondary rotary member for impacting the weed seeds in the second material.

18. The combine harvester according to claim 13 wherein said one or more components of the primary destructor are different from said one or more components of the secondary destructor so that a number of weed seeds devitalized in the primary destructor is different from that in the secondary destructor.

* * * * *